US011939890B2

(12) United States Patent
Kim et al.

(10) Patent No.: US 11,939,890 B2
(45) Date of Patent: Mar. 26, 2024

(54) CONTINUOUS VARIABLE VALVE DURATION APPARATUS AND CONTROL METHOD FOR THE SAME

(71) Applicants: HYUNDAI MOTOR COMPANY, Seoul (KR); KIA CORPORATION, Seoul (KR)

(72) Inventors: Hyeon Woo Kim, Seoul (KR); Back Sik Kim, Osan-si (KR); Jinyoung Jung, Gunpo-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/991,884

(22) Filed: Nov. 22, 2022

(65) Prior Publication Data

US 2023/0212964 A1 Jul. 6, 2023

(30) Foreign Application Priority Data

Dec. 30, 2021 (KR) ........................ 10-2021-0192872

(51) Int. Cl.

| | |
|---|---|
| ***F01L 1/047*** | (2006.01) |
| ***F01L 1/053*** | (2006.01) |
| ***F01L 1/344*** | (2006.01) |
| ***F01L 13/00*** | (2006.01) |
| ***F02D 13/02*** | (2006.01) |
| ***F02D 41/22*** | (2006.01) |

(52) U.S. Cl.

CPC ............... *F01L 1/047* (2013.01); *F01L 1/053* (2013.01); *F01L 1/344* (2013.01); *F01L 1/3442* (2013.01); *F01L 13/00* (2013.01); *F02D 13/0207* (2013.01); *F02D 41/22* (2013.01); *F01L 2001/0473* (2013.01); *F01L 2001/0476* (2013.01); *F01L 2013/103* (2013.01); *F01L 2013/111* (2013.01); *F01L 2305/00* (2020.05); *F01L 2820/032* (2013.01)

(58) Field of Classification Search

None

See application file for complete search history.

(56) References Cited

U.S. PATENT DOCUMENTS

| | | | | |
|---|---|---|---|---|
| 2017/0089230 | A1* | 3/2017 | Son | F01L 1/356 |
| 2018/0100444 | A1* | 4/2018 | Ryu | F01L 1/34 |
| 2020/0191086 | A1* | 6/2020 | Kim | F02D 41/144 |

(Continued)

*Primary Examiner* — Kenneth J Hansen

*Assistant Examiner* — Wesley G Harris

(74) *Attorney, Agent, or Firm* — Lempia Summerfield Katz LLC

(57) ABSTRACT

A continuous variable valve duration apparatus includes: a camshaft, a front cam unit and a rear cam unit of which the phase relative to the camshaft can be varied, a front inner wheel and a rear inner wheel, a front guide bracket and a rear guide bracket, a front wheel housing and a rear wheel housing, a front control shaft, a rear control shaft, a phase controller selectively changing the relative phase of the front control shaft and the rear control shaft, a main driving unit for driving the rear control shaft, vibration sensors that measure the vibration of each cylinder corresponding to the front cam unit and the rear cam unit and output a corresponding signal, and a controller for controlling the operation of the main driving unit and the phase controller according to the output signals of the respective vibration sensors.

11 Claims, 15 Drawing Sheets

(56) References Cited

U.S. PATENT DOCUMENTS

| | | | | |
|---|---|---|---|---|
| 2021/0017885 | A1* | 1/2021 | Kim | F01L 1/352 |
| 2021/0062691 | A1* | 3/2021 | Son | F01L 13/0015 |
| 2021/0381404 | A1* | 12/2021 | Kim | F01L 13/0015 |

* cited by examiner

CONTINUOUS VARIABLE VALVE DURATION APPARATUS AND CONTROL METHOD FOR THE SAME

CROSS-REFERENCE TO RELATED APPLICATION

This application claims priority to and the benefit of Korean Patent Application No. 10-2021-0192872, filed in the Korean Intellectual Property Office on Dec. 30, 2021, the entire contents of which are incorporated herein by reference.

BACKGROUND a) Field

The present disclosure relates to a continuous variable valve duration apparatus and a control method for the same. More particularly, the present disclosure relates to a continuous variable valve duration apparatus capable of controlling operation deviation between cylinders and a control method for the same.

b) Description of the Related Art

In general, an internal combustion engine generates power by combusting fuel and air in a combustion chamber. The intake valve is operated by driving the camshaft, and while the intake valve is open, air is flowed into the combustion chamber. Also, the exhaust valve is operated by driving the camshaft, and a combustion gas is exhausted from the combustion chamber while the exhaust valves are open.

Optimal operation of the intake valves and the exhaust valves depends on a rotation speed of the engine. In other words, an optimal lift or optimal opening/closing timing of the valves depends on the rotation speed of the engine.

In order to achieve such optimal valve operation depending on the rotation speed of the engine, various researches, such as designing of a plurality of cams and a continuous variable valve lift (CVVL) that can change an amount of a valve lift according to the engine speed, have been undertaken.

In addition, a continuous variable valve duration (CVVD) apparatus that varies the duration of opening and closing of the valve is being researched.

However, the continuous variable valve duration (CVVD) apparatus includes two pairs of lifter-assembly as a set. Because there is a manufacturing deviation for each part, the alignment of the front and rear wheel housings is misaligned, and the rotation axis deviation of the front and rear eccentric wheels of the CVVD may occur.

The deviation of the front and rear eccentric wheels of the CVVD may vary the valve duration of first and second cylinders and third and fourth cylinders by different operation of the front and rear CVVD apparatus.

The above information disclosed in this Background section is provided only to enhance understanding of the background of the present disclosure. Therefore, it may contain information that does not form the prior art that is already known to a person of ordinary skill in the art.

SUMMARY

The present disclosure has been made in an effort to provide a continuous variable valve duration (CVVD) apparatus and a control method for the same to improve engine operation by correcting manufacturing deviation of the CVVD apparatus.

According to an embodiment of the present disclosure, a continuous variable valve duration (CVVD) apparatus may include: a camshaft; a front cam unit and a rear cam unit in which cams are formed, the camshaft is inserted, and a phase relative to the camshaft can be varied; a front inner wheel and a rear inner wheel for transmitting the rotation of the camshaft to the front cam unit and the rear cam unit, respectively; and a front guide bracket and a rear guide bracket. The CVVD apparatus further includes: a front wheel housing and a rear wheel housing to which the front inner wheel and the rear inner wheel are rotatably inserted, respectively; and a front guide thread and a rear guide thread are formed in the front wheel housing and the rear wheel housing respectively. In particular, the front wheel housing and the rear wheel housing are movably inserted into the front guide bracket and the rear guide bracket, respectively; The CVVD apparatus further includes: a front control shaft on which a front control worm for rotating the front guide thread is formed; a rear control shaft on which a rear control worm for rotating the rear guide thread is formed; a phase controller selectively changing the relative phase of the front control shaft and the rear control shaft; a main driving unit for driving the rear control shaft; vibration sensors that measure the vibration of each cylinder corresponding to the front cam unit and the rear cam unit and output a corresponding signal; and a controller for controlling the operation of the main driving unit and the phase controller according to the output signals of the respective vibration sensors.

In another embodiment, an inner shaft may be formed at one end of one of the front control shaft and the rear control shaft, and an outer shaft into which the inner shaft is rotatably inserted may be formed at the other end of the front control shaft and the rear control shaft. The phase controller may include a stator mounted on the inner shaft, a rotor mounted on the outer shaft, a phase angle sensor measuring the relative phase angles of the inner shaft and the outer shaft, a plurality of slip rings rotatably mounted on the outer shaft to apply power and control signals to the rotor, and brushes contacting the plurality of slip rings, respectively.

The stator may include a permanent magnet, and the rotor may include an electromagnet.

The continuous variable valve duration apparatus according to an embodiment of the present disclosure may further include a fixing portion for fixing the inner shaft and the outer shaft.

The continuous variable valve duration apparatus according to an embodiment of the present disclosure may further include a rear worm wheel to which an inner thread configured to engage with the rear guide thread is formed therewithin, to which an outer thread configured to engage with the rear control worm is formed thereto, and the rear worm wheel rotatably mounted to the rear guide bracket, and a front worm wheel to which an inner thread configured to engage with the front guide thread is formed therewithin, to which an outer thread configured to engage with the front control worm is formed thereto, and the front worm wheel rotatably mounted to the front guide bracket.

The front guide bracket and the rear guide bracket may have a control shaft hole into which the front control shaft and the rear control shaft are respectively inserted.

A first and second sliding hole may be formed in the front inner wheel and the rear inner wheel, respectively, and a cam slot may be formed in the front cam unit and the rear cam unit, respectively. The continuous variable valve duration apparatus according to an embodiment of the present disclosure may further include a roller wheel coupled to the camshaft and rotatably inserted into the first sliding hole respectively, and a roller cam that is slidably inserted into the cam slot and rotatably inserted into the second sliding hole, respectively.

The roller cam may include a roller cam body slidably inserted into the cam slot, a cam head rotatably inserted into the second sliding hole, and a protrusion configured to inhibit the roller cam from being removed.

The roller wheel may include a wheel body slidably connected to the camshaft, and a wheel head rotatably inserted into the first sliding hole.

The front cam unit and the rear cam unit may include a first cam portion and a second cam portion which are disposed corresponding to a cylinder and an adjacent cylinder respectively, and the front inner wheel and the rear inner wheel may include a first inner wheel and a second inner wheel configured to transmit the rotation of the camshaft to the first cam portion and the second cam portion respectively.

According to another embodiment of the present disclosure, a control method for the continuous variable valve duration apparatus may include: controlling, by the controller, the operation of the phase controller to fix the relative phase of the front control shaft and the rear control shaft; measuring, by the controller, the roughness of each cylinder based on an output signal of a vehicle operating condition measurement unit including output signals of the vibration sensors; comparing, by the controller, the roughness of each cylinder with a predetermined allowable roughness; and stopping control when the roughness of each cylinder falls within the predetermined allowable roughness range.

The control method for the continuous variable valve duration apparatus according to an embodiment of the present disclosure may further include: determining, by the controller, whether a cylinder that does not correspond to the predetermined allowable roughness range corresponds to the rear cam unit if the roughness of each cylinder does not correspond to the predetermined allowable roughness range; and controlling, by the controller, the main driving unit to control a phase of the rear control shaft when the cylinder that does not fall within the predetermined allowable roughness range corresponds to the rear cam unit.

The control method for the continuous variable valve duration apparatus according to an embodiment of the present disclosure may further include controlling the phase of the front control shaft by the controller driving the phase controller.

The control method for the continuous variable valve duration apparatus according to an embodiment of the present disclosure may further include: recording, by the controller, control performance of the main driving unit and the phase controller, and stopping control if the number of recorded control performances corresponds to a predetermined control performance recording.

As described above, according to the continuous variable valve duration apparatus and control method for the same according to an embodiment of the present disclosure, it is possible to improve the engine operation by adjusting the manufacturing deviation of the CVVD apparatus.

In addition, the continuous variable valve duration apparatus according to an embodiment of the present disclosure can be applied without excessive design change of the existing general engine, so productivity can be increased and production cost can be reduced.

DETAILED DESCRIPTION

Figure 1:
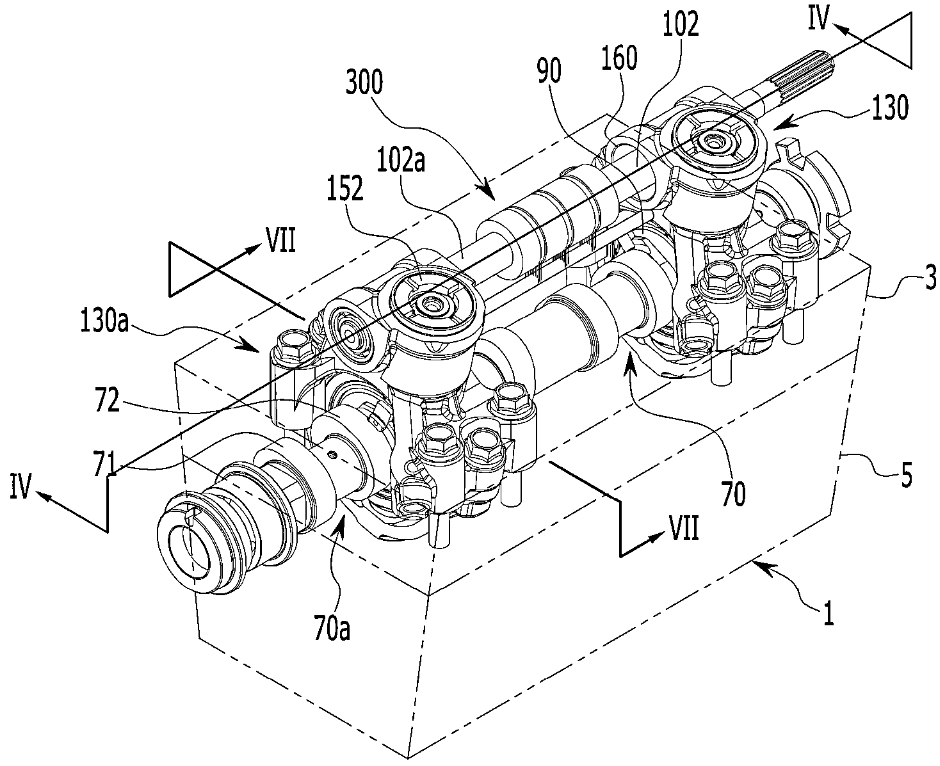
FIG. 1 is a perspective view of an engine provided with a continuous variable valve duration apparatus according to an embodiment of the present disclosure.

The present disclosure is described more fully hereinafter with reference to the accompanying drawings, in which embodiments of the present disclosure are shown.

As those having ordinary skill in the art would realize, the described embodiments may be modified in various different ways, all without departing from the spirit or scope of the present disclosure.

In order to clearly explain the present disclosure, parts irrelevant to the description have been omitted, and the same reference numerals are assigned to the same or similar elements throughout the specification.

Since the size and thickness of each component shown in the drawing are arbitrarily indicated for convenience of explanation, the present disclosure is not necessarily limited to the one shown in the drawing, and the thickness is enlarged to clearly express various parts and areas.

In addition, in the detailed description below, the reason that the names of the components are divided into first, second, etc. is to classify the components in the same relationship, and the order is not necessarily limited in the following description.

Throughout the specification, when it is said that a certain part includes certain constituent elements, this means that other constituent elements may be further included, rather than excluding other constituent elements, unless specifically stated otherwise.

In addition, terms such as . . . part, . . . means described in the specification mean a unit of a comprehensive configuration that performs at least one function or operation. When a component, device, element, or the like of the present disclosure is described as having a purpose or performing an operation, function, or the like, the component, device, or element should be considered herein as being "configured to" meet that purpose or to perform that operation or function.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

An embodiment of the present disclosure is hereinafter described in detail with reference to the accompanying drawings.

Figure 2:
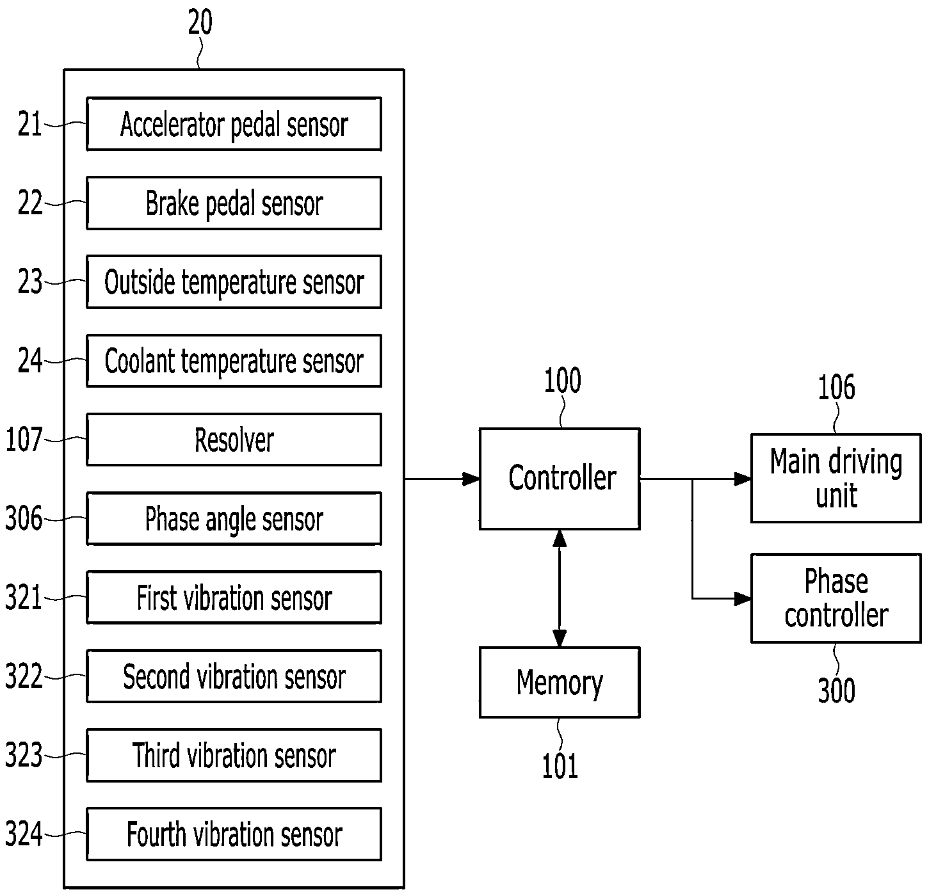
FIG. 2 is a schematic diagram of a continuous variable valve duration apparatus according to an embodiment of the present disclosure.

FIG. 1 is a perspective view of an engine provided with a continuous variable valve duration apparatus according to an embodiment of the present disclosure, and FIG. 2 is a schematic diagram of a continuous variable valve duration apparatus according to an embodiment of the present disclosure.

Figure 3:
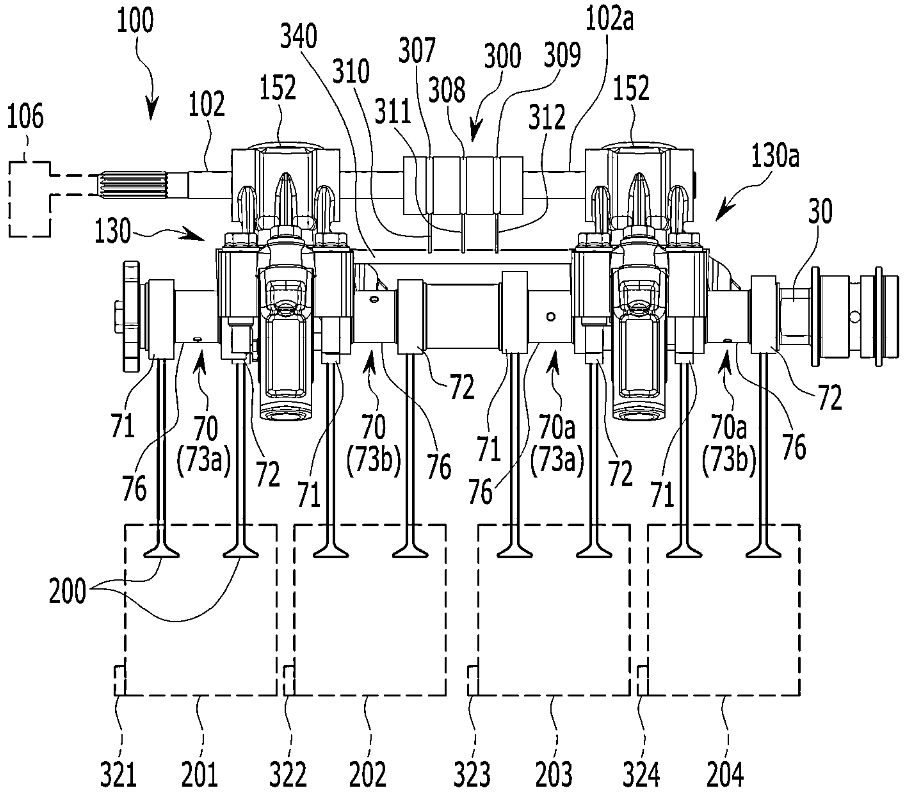
FIG. 3 is a side view of a continuous variable valve duration apparatus according to an embodiment of the present disclosure.
Figure 4:
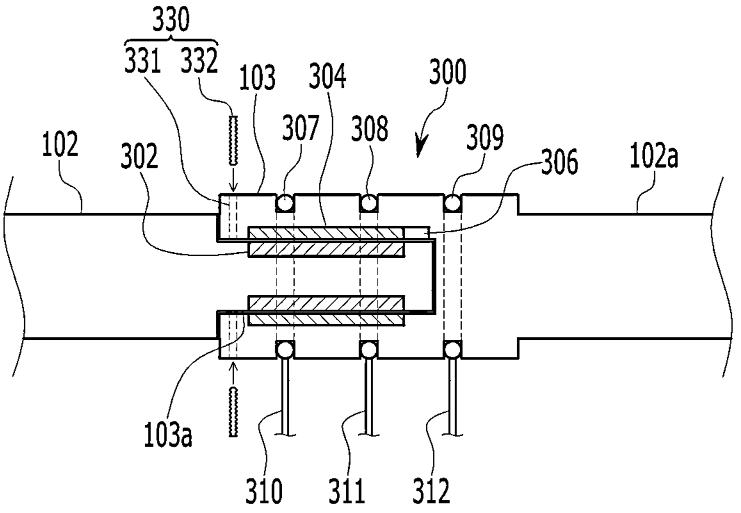
FIG. 4 is a partial cross-sectional view along the IV-IV line in FIG. 1.

FIG. 3 is a side view of a continuous variable valve duration apparatus according to an embodiment of the present disclosure, and FIG. 4 is a partial cross-sectional view along the IV-IV line in FIG. 1.

Referring to FIG. 1 to FIG. 4, an engine 1 according to an embodiment of the present disclosure includes a cylinder head 3, an engine block 5, and a continuous variable valve duration apparatus according to an embodiment of the present disclosure mounted on the cylinder head 3.

In the drawings, 4 cylinders 211, 212, 213 and 214 are formed to the engine, but the present disclosure is not limited thereto.

The continuous variable valve duration apparatus may include: a vehicle operating condition measurement unit 20 that measures the operation state of the vehicle and outputs a corresponding signal, and a controller 100 for controlling a main driving unit 106 and a phase controller 300 to be described later according to the output signal of the vehicle operating condition measurement unit 20.

The controller 100 may each be implemented by one or more microprocessors operating according to a set program, and the set program may include a series of instructions for performing a method according to an embodiment of the present disclosure to be described later.

The continuous variable valve duration apparatus may further include a memory 101 configured to store a series of instructions for performing the control method of the continuous variable valve duration apparatus according to an embodiment of the present disclosure.

The vehicle operating condition measurement unit 20 may include an accelerator pedal sensor 21 that measures the operation of the accelerator pedal and outputs a corresponding signal, a brake pedal sensor 22 that measures the operation of the brake pedal and outputs a corresponding signal, an outside temperature sensor 23 that measures the outside temperature and outputs a corresponding signal, and a coolant temperature sensor 24 that measures the temperature of the coolant and outputs the corresponding signal.

In addition, the vehicle operating condition measurement unit 20 may include a sensor 107 that measures the operation of the main driving unit 106 and outputs a corresponding signal, for example, the sensor 107 may be a resolver.

In addition, the vehicle operating condition measurement unit 20 may include a phase angle sensor 306 that measures a phase change by operation of the phase controller 300 and outputs a corresponding signal.

In addition, the vehicle operating condition measurement unit 20 may include first, second, third, and fourth vibration sensors 321, 322, 323, and 324 mounted on the corresponding cylinder, for example, first, second, third, and fourth cylinders 201, 202, 203, and 204 to measure vibration and output the corresponding signal.

Figure 5:
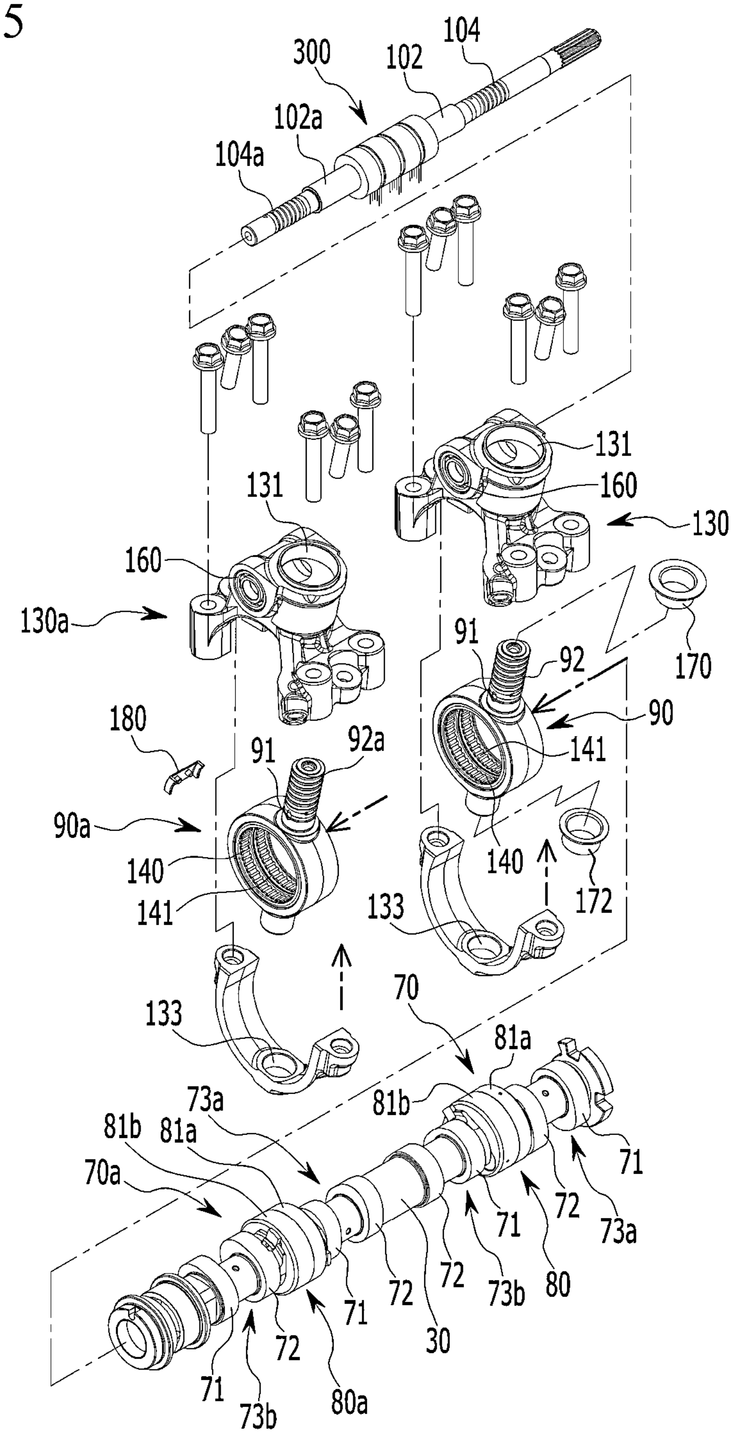
FIG. 5 and FIG. 6 are partially exploded perspective views of a continuous variable valve duration apparatus according to an embodiment of the present disclosure.
Figure 6:
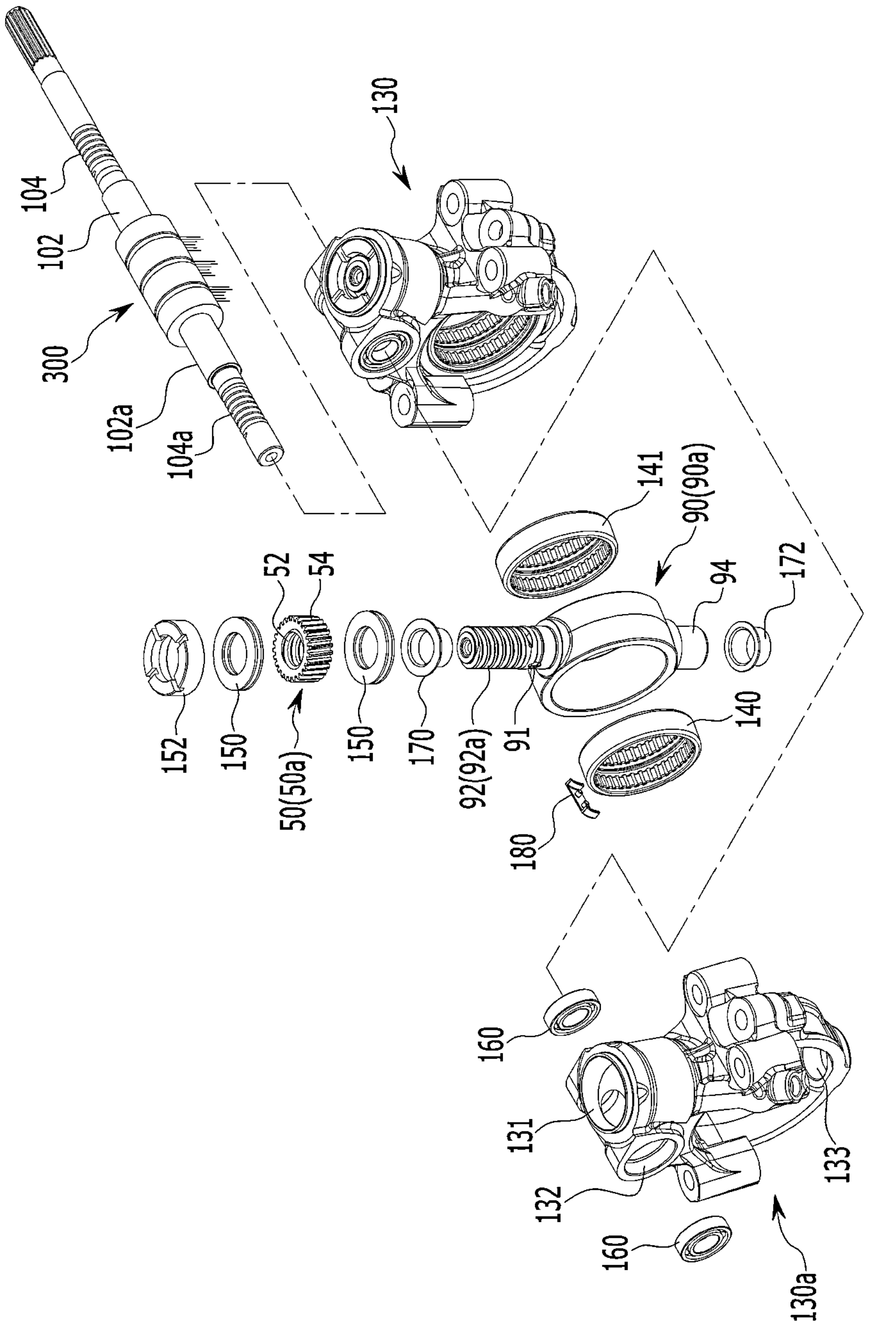

FIG. 5 and FIG. 6 are partially exploded perspective views of a continuous variable valve duration apparatus according to an embodiment of the present disclosure.

Referring to FIG. 1 to FIG. 6, a continuously variable valve duration apparatus according to an embodiment of the present disclosure may include a camshaft 30, a front cam unit 70*a*, and a rear cam unit 70. Each of the front cam unit 70*a* and the rear cam unit 70 is formed with cams 71 and 72, and the camshaft 30 is inserted through the front cam unit 70*a* and rear cam unit 70. In particular, a phase of the front cam unit 70*a* and the rear cam unit 70 relative to the camshaft 30 can be varied. The continuously variable valve duration apparatus further includes: a front inner wheel 80*a* and a rear inner wheel 80 for respectively transmitting the rotation of the camshaft 30 to the front cam unit 70*a* and the rear cam unit 70; a front guide bracket 130*a* and a rear guide bracket 130; and a front wheel housing 90*a* and a rear wheel housing 90. The front inner wheel 80*a* and the rear inner wheel 80 are rotatably inserted to the front wheel housing 90*a* and the rear wheel housing 90, respectively. and a front guide thread 92*a* and a rear guide thread 92 are formed in the front wheel housing 90*a* and the rear wheel housing 90, respectively. In particular, as illustrated in FIG. 5, the front guide thread 92*a* is formed in a guide shaft 91 formed on the front wheel housing 90*a*, and the rear guide thread 92 is formed on a guide shaft 91 formed on the rear wheel housing 90. The front wheel housing 90*a* and the rear wheel housing 90 are movably inserted into the front guide bracket 130*a* and the rear guide bracket 130, respectively. The continuously variable valve duration apparatus further includes: a front control shaft 102*a* on which a front control worm 104*a* for rotating the front guide thread 92*a* is formed; a rear control shaft 102 on which a rear control worm 104 for rotating the rear guide thread 92 is formed; the phase controller 300 selectively changing the relative phase of the front control shaft 102*a* and the rear control shaft 102; the main driving unit 106 for driving the rear control shaft 102; the vibration sensors 321, 322, 323, and 324 that measure the vibration of each cylinder corresponding to the front cam unit 70*a* and the rear cam unit 70 and output a corresponding signal; and the controller 100 for controlling the operation of the main driving unit 106 and the phase controller 300 according to the output signals of the respective vibration sensors 321, 322, 323 and 324.

The camshaft 30 may be an intake camshaft or an exhaust camshaft.

The meaning of front and rear in detailed description and claim is defined based on the position of the main driving unit 106.

Referring to FIG. 3 and FIG. 4, an inner shaft 103*a* is formed at one end of any one of the front control shaft 102*a* and the rear control shaft 102, and an outer shaft 103 into which the inner shaft 103*a* is rotatably inserted may be formed at the other end of the front control shaft 102*a* and the rear control shaft 102.

That is, the drawing shows that the outer shaft 103 is formed on the front control shaft 102*a* and the inner shaft

103*a* is formed on the rear control shaft 102, but is not limited thereto, and the reverse configuration is also possible.

The phase controller 300 may include a stator 302 mounted on the inner shaft 103*a*, a rotor 304 mounted on the outer shaft 103, a phase angle sensor 306 measuring the relative phase angles of the inner shaft 103*a* and the outer shaft 103, a plurality of slip rings 307, 308, and 309 rotatably mounted on the outer shaft 103 to apply power and control signals to the rotor 304 and brushes 310, 311, and 312 contacting the plurality of slip rings 307, 308, and 309 respectively.

The brushes 310, 311, and 312 may be mounted to a phase controller bracket 340.

The stator 302 may include a permanent magnet, and the rotor 304 may include an electromagnet.

According to the control of the controller 100, power and control signals are transmitted through the brush 310, 311, and 312 and the slip rings 307, 308, and 309, so that the relative phase of the stator 302 and the rotor 304 can be changed or fixed. Therefore, the relative phase of the rear control shaft 102 and the front control shaft 102*a* can be changed or fixed.

The relative phase of the rear control shaft 102 and the front control shaft 102*a* may be measured by the phase angle sensor 306 and a corresponding signal may be transmitted to the controller 100.

The operation of the phase controller 300 by the control of the controller 100 is described below.

The continuous variable valve duration apparatus according to an embodiment of the present disclosure may further include a fixing portion 330 for fixing the inner shaft 103*a* and the outer shaft 103.

The fixing portion 330 may include a bolt hole 331 formed in the outer shaft 103, and a bolt 332 inserted into the bolt hole 331 to fix the inner shaft 103*a* and the outer shaft 103, for example, a headless bolt.

Through the initial test of engine 1, the phase controller 300 is operated by the control of the controller 100 to control the relative phase of the rear control shaft 102 and the front control shaft 102*a*. After that, the controller 100 fixes the operation of the phase controller 300 so that the engine 1 can be driven without a relative phase change between the rear control shaft 102 and the front control shaft 102*a*.

And, when the engine 1 is deformed due to wear after long-term use, the controller 100 can operate the phase controller 300 again.

However, the continuous variable valve duration apparatus according to an embodiment of the present disclosure can drive the engine 1 without relative phase control by fixing the rear control shaft 102 and the front control shaft 102*a* through the fixing portion 330.

In this case, there is no need to apply power and control signals to the phase controller 300, so enhancement of fuel efficiency is possible.

That is, after readjusting the relative phases of the rear control shaft 102 and the front control shaft 102*a* for maintenance, etc., the rear control shaft 102 and the front control shaft (102*a*) can be fixed.

Figure 7:
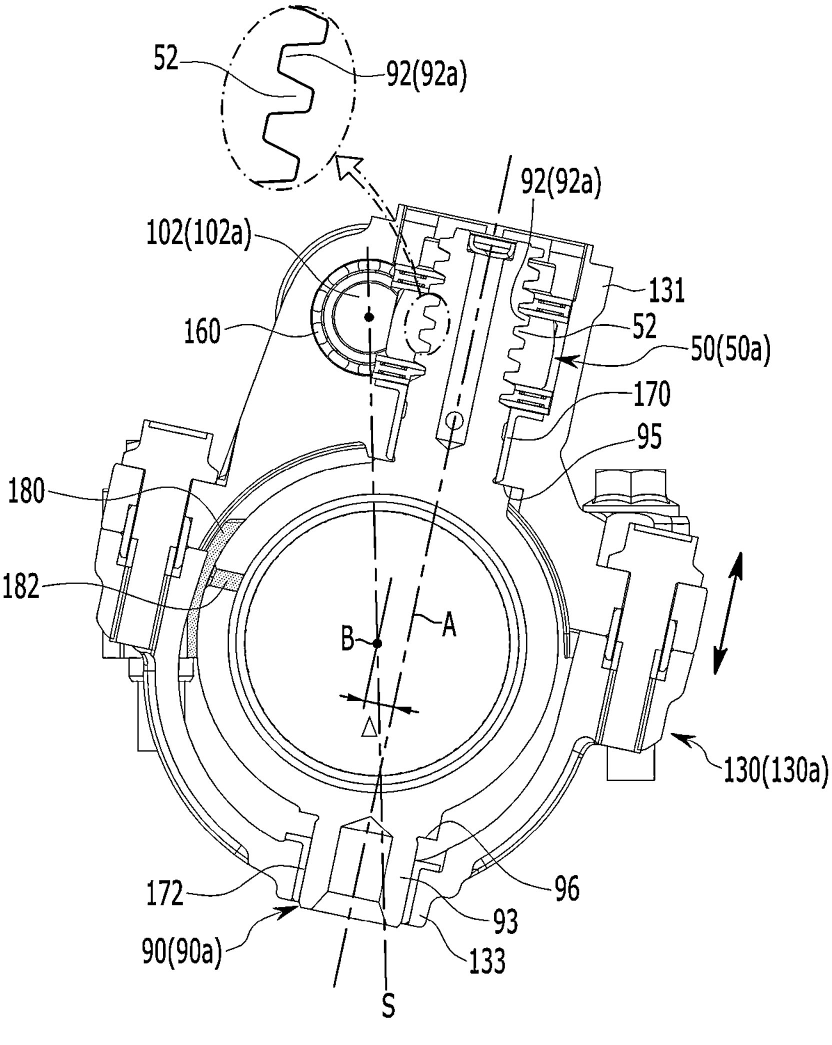
FIG. 7 is a cross-sectional view along the line VII-VII in FIG. 1.
Figure 8:
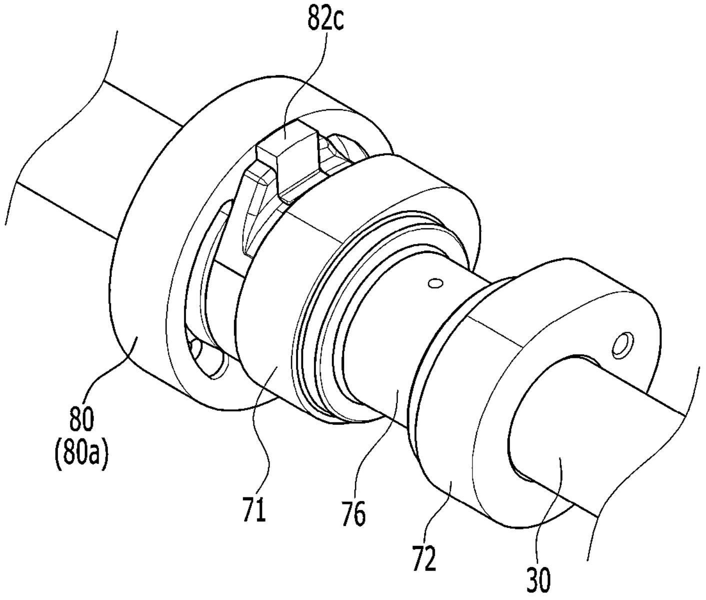
FIG. 8 is a perspective view showing an inner wheel and a cam unit applied to a continuous variable valve duration apparatus according to an embodiment of the present disclosure.
Figure 9:
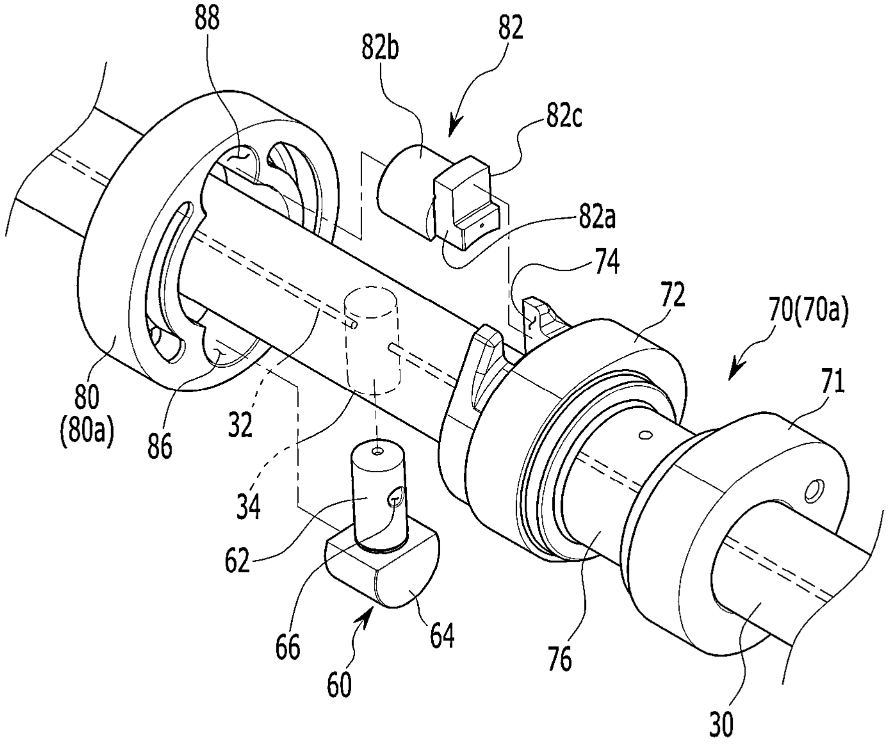
FIG. 9 is an exploded perspective view of FIG. 8.

FIG. 7 is a cross-sectional view along the line VII-VII in FIG. 1, FIG. 8 is a perspective view showing an inner wheel and a cam unit applied to a continuous variable valve duration apparatus according to an embodiment of the present disclosure, and FIG. 9 is an exploded perspective view of FIG. 8.

Referring to FIG. 1 to FIG. 9, an upper guide boss 131 is formed on the front guide bracket 130*a* and the rear guide bracket 130, and a guide shaft 91 is formed on the front wheel housing 90*a* and the rear wheel housing 90, respectively and movably inserted into the upper guide boss 131.

The continuous variable valve duration apparatus according to an embodiment of the present disclosure may further include a rear worm wheel 50 to which an inner thread 52 configured to engage with the rear guide thread 92 is formed therewithin, to which an outer thread 54 configured to engage with the rear control worm 104 is formed thereto, and the rear worm wheel 50 rotatably mounted to the rear guide bracket 130, and a front worm wheel 50*a* to which an inner thread 52 configured to engage with the front guide thread 92*a* is formed therewithin, to which an outer thread 54 configured to engage with the front control worm 104*a* is formed thereto, and the front worm wheel 50*a* rotatably mounted to the front guide bracket 130*a*.

The continuous variable valve duration apparatus according to an embodiment of the present disclosure may include an upper bushing 170 that is mounted on the lower part of the upper guide boss 131 to support the guide shaft 91.

The upper bushing 170 may support the rotation of the upper guide boss 131 and suppress wear occurrence.

A control shaft hole 132 supporting the front control shaft 102*a* and the rear control shaft 102 is formed in the front guide bracket 130*a* and the rear guide bracket 130, respectively, and a control shaft bearing 160 is mounted in the control shaft hole 132 to support the rotation of the front control shaft 102*a* and the rear control shaft 102.

A thrust bearing 150 is mounted to the guide boss 131 to support each of the worm wheels 50 and 50*a*, and as shown in the drawing, the thrust bearing 150 may be mounted above and below each of the worm wheels 50 and 50*a*, respectively.

A worm cap 152 may be coupled to the each guide brackets 130, 130*a* to support the thrust bearing 150, for example, the worm cap 152 may be coupled to the each guide brackets 130, 130*a* by caulking.

Referring to FIG. 7, the inner thread 52 of each of the worm wheels 50, 50*a* and the each guide threads 92, 92*a* may be trapezoidal threads.

Accordingly, the rotation of the each control shafts 102 and 102*a* is transmitted to the worm wheels 50 and 50*a*, so that the up and down movements of the wheel housings 90 and 90*a* may be smoothly controlled.

The thrust bearing 150 allows the worm wheels 50 and 50*a* to rotate smoothly, and the worm cap 152 fixes the positions of the worm wheels 50 and 50*a*.

Accordingly, the worm wheels 50 and 50*a* are mounted at the fixed positions of the guide bracket 130, and the wheel housings 90 and 90*a* may smoothly move in the vertical direction of drawing according to the rotation of the worm wheels 50 and 50*a*.

A lower guide boss 133 is formed on each of the guide brackets 130 and 130*a*, and a guide rod 94 inserted into the lower guide boss 133 to guide the movement of each wheel housing 90 and 90*a* is formed on the wheel housing 90 and 90*a*.

The guide rod 94 guides the movement of the respective wheel housing 90 and 90*a*, and can prevent the vibration of the respective wheel housing 90 and 90*a*.

A lower bushing 172 supporting the guide rod 94 may be mounted on the lower part of the lower guide boss 133.

The bushings 170, and 172 are applied between the respective wheel housing 90, and 90*a* and the respective guide bracket 130, and 130*a* to prevent vibration of the respective wheel housing 90, and 90*a*, so that it is possible to prevent wear and reinforce strength.

For example, the respective wheel housing 90, and 90*a* and the respective guide bracket 130, and 130*a* are formed of aluminum material, the upper bushing 170 and the lower bushing 172 are formed of steel material to stably support the movement of the wheel housing 90, and 90*a* and reduce the thicknesses of the upper guide boss 131 and the lower guide boss 133.

The center B of each of the inner wheels 80 and 80*a* may be deviating from the imaginary line A that connects the upper guide boss 131 and the lower guide boss 133.

The camshaft 30 and the respective control shafts 102 and 102*a* may be mounted on a virtual vertical line S.

Therefore, it is possible to prevent the tool from interfering when the bolt engages the cam cap.

Here, the virtual vertical line S does not mean that it is on a completely vertical line, but it is a practical vertical line (substantially vertical), which means a configuration capable of minimizing interference when working through a tool.

The center B of the inner wheel 80, and 80*a* is offset (A) with the imaginary line A connecting the upper guide boss 131 and the lower guide boss 133, so even if a slight slope is given to the valve duration apparatus, the camshaft 30 and the control shaft 102, and 102*a* can be mounted on the virtual vertical line S.

The continuous variable valve duration apparatus according to an embodiment of the present disclosure may further include an insert 180 interposed between the respective wheel housing 90, and 90*a* and the respective guide bracket 130, and 130*a*, respectively.

The insert 180 can be fixed to either the wheel housing 90, and 90*a* or the guide bracket 130, and 130*a*.

For example, an insert protrusion 182 is formed in the insert 180, and may be coupled using the insert protrusion 182.

The insert 180 may be formed of a plastic material.

When the wheel housing 90, and 90*a* and the guide bracket 130, and 130*a* made of metal materials contact each other, noise and vibration may occur.

However, the insert 180 formed of plastic material is interposed between the wheel housing 90, and 90*a* and the guide bracket 130, and 130*a* respectively to act as a damping function to suppress noise and vibration.

Each of the wheel housings 90 and 90*a* has an upper stopper 95 and a lower stopper 96 that contact the guide bracket 130 to limit the movement of each wheel housing 90, and 90*a*.

FIG. 8 is a perspective view showing an inner wheel and a cam unit applied to a continuous variable valve duration apparatus according to an embodiment of the present disclosure, and FIG. 9 is an exploded perspective view of FIG. 8.

Referring to FIG. 1 to FIG. 9, first and second sliding holes 86 and 88 are formed to each inner wheel 80 and 80*a*, and cam slot 74 is formed to each cam unit 70 and 70*a*.

The continuous variable valve duration apparatus further includes a roller wheel 60 connected to the camshaft 30 and rotatably inserted into the first sliding hole 86 and a roller cam 82 slidably inserted into the cam slot 74 and rotatably inserted into the second sliding hole 88.

The roller cam 82 includes a roller cam body 82*a* slidably inserted into the cam slot 74 and a cam head 82*b* rotatably inserted into the second sliding hole 88.

A protrusion 82*c* is formed at the roller cam 82 for preventing the roller cam 82 from being separated from the inner wheel 80 along the longitudinal direction of the camshaft 30.

The roller wheel 60 includes a wheel body 62 slidably connected to the camshaft 30 and a wheel head 64 rotatably inserted into the first sliding hole 86 and the wheel body 62 and the wheel head 64 may be integrally formed.

A camshaft hole 34 is formed to the camshaft 30, the wheel body 62 of the roller wheel 60 is movably inserted into the camshaft hole 34 and the wheel head 64 is rotatably inserted into the first sliding hole 86.

A camshaft oil hole 32 is formed within the camshaft 30 along a longitudinal direction thereof, a body oil hole 66 communicated with the camshaft oil hole 32 is formed to the wheel body 62 of the roller wheel 60 and an oil groove 68 (referring to FIG. 10) communicated with the body oil hole 66 is formed to the wheel head 64 of the roller wheel 60.

Lubricant supplied to the camshaft oil hole 32 may be supplied to the inner wheel 80, 80*a* respectively through the body oil hole 66, the communicate hole 69 and the oil groove 68.

Referring to FIG. 2, and FIG. 5, the each cam unit 70, and 70*a* includes a first cam portion 73*a* and a second cam portion 73*b* which are disposed corresponding to a cylinder and an adjacent cylinder respectively, for example the first cylinder 201 and the adjacent second cylinder 202, and a first cam portion 73*a* and a second cam portion 73*b* which are disposed corresponding to a cylinder and an adjacent cylinder respectively, for example the third cylinder 203 and the adjacent fourth cylinder 204.

The inner wheel 80, 80*a* includes a first inner wheel 81*a* and a second inner wheel 81*b* transmitting rotation of the camshaft 30 to the first cam portion 73*a* and the second cam portion 73*b* respectively.

The continuous variable valve duration apparatus further includes first and second bearings 140, and 141*a* disposed within the each wheel housing 90, and 90*a* respectively for supporting the first inner wheel 81*a* and the second inner wheel 81*b*.

The first and second bearings 140, and 141*a* may be a needle bearing, the first and the second inner wheels 81*a* and 81*b* are disposed within one wheel housing 90 and 90*a*, respectively, and the first and second bearings 140 and 141*a* may rotatably support the first and the second inner wheels 81*a* and 81*b*.

Since the first and the second inner wheels 81*a*, 81*b* may be disposed within each wheel housing 90, and 90*a*, so that element numbers may be reduced, and productivity and manufacturing economy may be enhanced.

The valve 200 opens and closes in contact with the cam 71, and 72.

Figure 10:
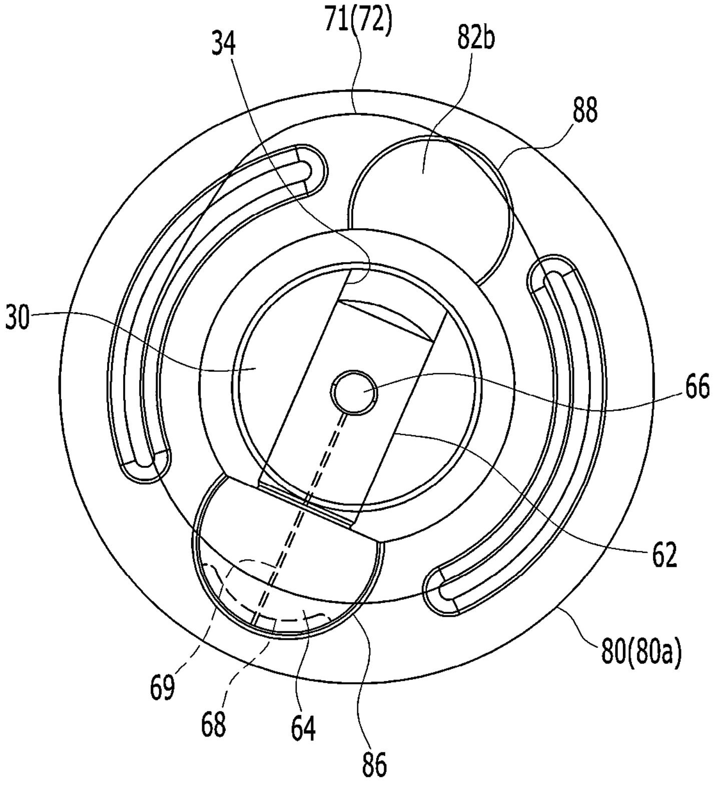
FIG. 10 to FIG. 12 are drawings illustrating an operation of a continuous variable valve duration apparatus according to an embodiment of the present disclosure.
Figure 11:
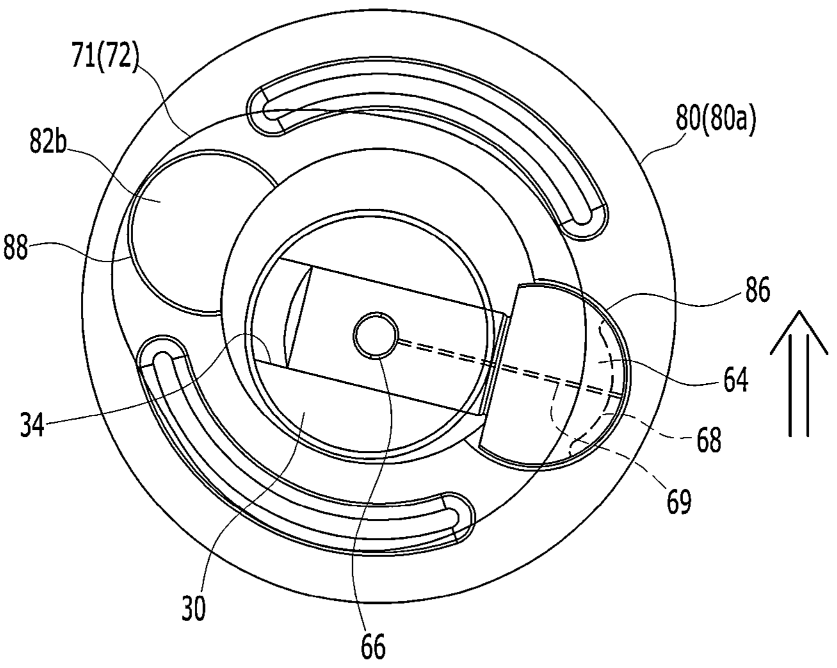
Figure 12:
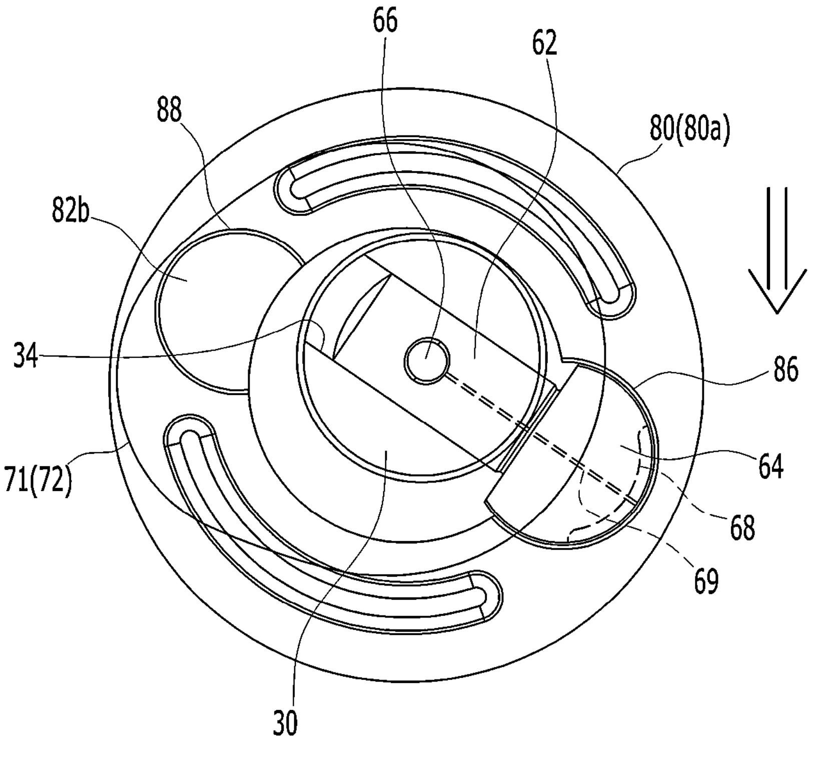

FIG. 10 to FIG. 12 are drawings illustrating an operation of a continuous variable valve duration apparatus according to an embodiment of the present disclosure.

As shown in FIG. 10, when rotation centers of the camshaft 30 and each cam unit 70 and 70*a* are coincident, the cams 71 and 72 rotate with the same phase angle of the camshaft 30.

According to engine operation states, an ECU (engine control unit or electric control unit) transmits control signals to the control portion 100, then for example, the main driving unit 106 rotates the rear control shaft 102 and the phase controller 300 is fixed, the front control shaft 102*a* also rotates together with the rear control shaft 102.

Referring to FIG. 7, FIG. 11 and FIG. 12, the each control worm 104, and 104*a* engaged with the outer thread 54 rotates the worm wheel 50, and 50*a* respectively. And when each of the worm wheels 50 and 50*a* rotates, the inner thread 52 engaged guide threads 92 and 92*a* respectively move relative to each other.

That is, the respective worm wheels 50 and 50*a* rotate by the rotation of the respective control shafts 102 and 102*a*, and the relative positions of the respective wheel housings 90 and 90*a* with respect to the camshaft 30 are changed.

When the position of each wheel housing 90, 90*a* is moved upward or downward relative to the rotation center of the camshaft 30, the rotation speed of the cam 71, and 72 with respect to the camshaft 30 is changed according to the phase.

While the wheel body 62 of the roller wheel 60 is movably inserted into the camshaft hole 34 formed in the camshaft 30, the wheel head 64 is rotatably inserted in the first sliding hole 86, and the roller cam 82 is rotatably inserted into the second sliding hole 88 and is movable within the cam slot 74. Thus, the relative rotation speed of the cams 71 and 72 with respect to the rotation speed of the camshaft 30 is changed.

Figure 13A:
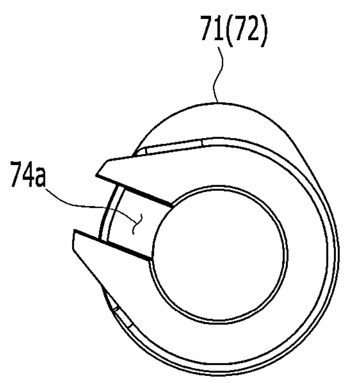
FIG. 13A and FIG. 13B are drawings respectively showing a cam slot of a continuous variable valve duration apparatus according to an embodiment of the present disclosure.
Figure 13B:
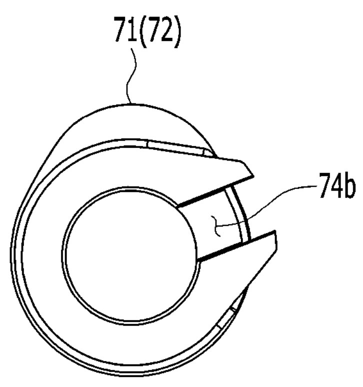
Figure 14A:
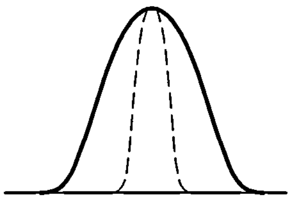
FIGS. 14A, 14B and 14C are graphs respectively showing valve profile of a continuous variable valve duration apparatus according to an embodiment of the present disclosure.
Figure 14B:
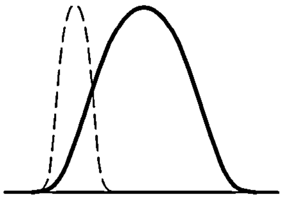
Figure 14C:
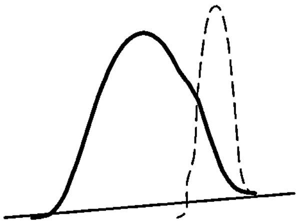

FIG. 13A and FIG. 13B are a drawing showing a cam slot of a continuous variable valve duration apparatus according to an embodiment of the present disclosure, and FIGS. 14A, 14B and 14C are graphs respectively showing a valve profile of a continuous variable valve duration apparatus according to an embodiment of the present disclosure.

As shown in FIG. 13, the cam slot 74 may be formed more retarded than a position of the cam 71 or 72 (referring to FIG. 13A) or the cam slot 74 may be formed more advanced than a position of the cam 71 or 72 (referring to FIG. 13B), or the cam slot 74 may be formed with the same phase of the cam 71 or 72. With the above scheme, various valve profiles may be achieved.

Although maximum lift of the valve 200 is constant, however rotation speed of the cam 71 and 72 with respect to the rotation speed of the camshaft 30 is changed according to relative positions of the slider housing 90, 90*a* so that closing and opening time of the valve 200 is changed. That is, duration of the valve 200 is changed.

According to the relative position of the cam slot 74, mounting angle of the valve 200 and so on, opening and closing time of the valve may be simultaneously changed as shown in FIG. 14A.

While opening time of the valve 200 is constant, closing time of the valve 200 may be retarded or advanced as shown FIG. 14B.

While closing time of the valve 200 is constant, opening time of the valve 200 may be retarded or advanced as shown FIG. 14C.

Figure 15:
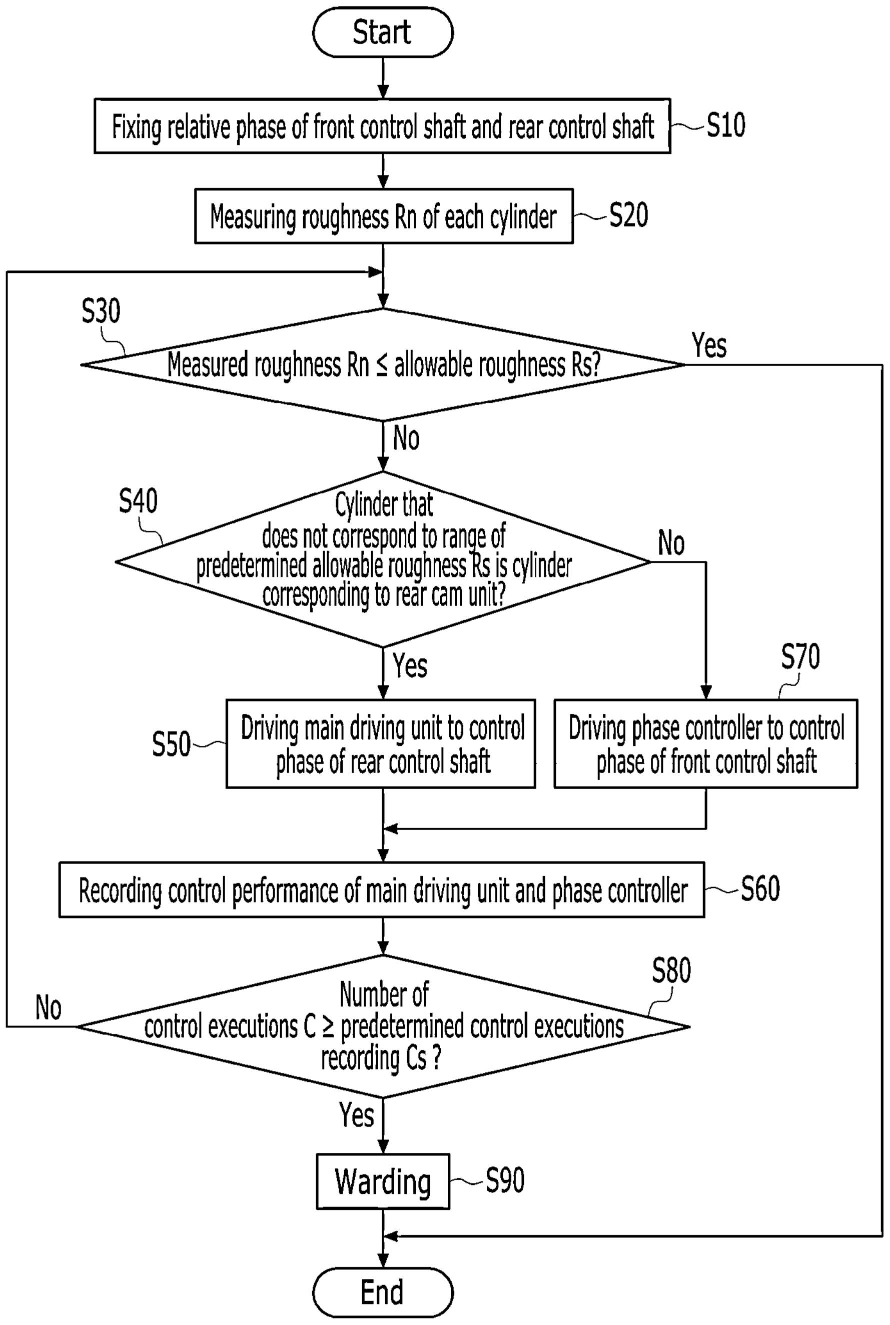
FIG. 15 is a flowchart showing a control method of a continuous variable valve duration apparatus according to an embodiment of the present disclosure.

FIG. 15 is a flowchart showing a control method of a continuous variable valve duration apparatus according to an embodiment of the present disclosure.

Hereinafter, referring to FIG. 15, a control method of a continuous variable valve duration apparatus according to an embodiment of the present disclosure is described below.

In the control method of the continuous variable valve duration apparatus according to an embodiment of the present disclosure, the controller 100 controls the operation of the phase controller 300 to fix the relative phase of the front control shaft 102*a* and the rear control shaft 102 at step S10. That is, the controller 100 controls the phase controller 300 so that the front control shaft 102*a* and the rear control shaft 102 rotate integrally while maintaining the same phase angle.

The controller 100 measures the roughness Rn of each cylinder 211. 212, 213, and 214 according to the output signal of the vehicle operating condition measurement unit 20 including the output signals of the vibration sensors 321, 322, 323, and 324 at step S20.

Here, the Roughness Rn represents combust stability by vibration according to the combust of each cylinder 211. 212, 213, and 214

The controller 100 compares the measured roughness Rn of each cylinder with a predetermined allowable roughness Rs at step S30.

The predetermined allowable roughness Rs may be set in a certain range, which may be preset by an experiment.

When the controller 100 determines that the roughness Rn of each cylinder falls within the range of the predetermined allowable roughness Rs, control is stopped.

Here, the stopping control means that the tolerance of the current continuous variable valve duration apparatus is within the allowable range, and alignment of the additional continuous variable valve duration apparatus is unnecessary.

In the control method of the continuous variable valve duration apparatus, if the roughness Rn of each cylinder does not correspond to the range of the predetermined allowable roughness Rs, the controller 100 determines whether a cylinder that does not correspond to the range of the predetermined allowable roughness Rs is a cylinder corresponding to the rear cam unit 70 at step S40.

For example, the controller 100 determines whether a cylinder that does not correspond to the range of the predetermined allowable roughness Rs is the first cylinder 211 or the second cylinder 212.

When the cylinder that does not fall within the range of the predetermined allowable roughness Rs is the first cylinder 211 or the second cylinder 212 corresponding to the rear cam unit 70, the controller 100 drives the main driving unit 106 to control the phase of the rear control shaft 102 at step S50.

That is, in the state in which the front control shaft 102*a* and the rear control shaft 102 rotate integrally while maintaining the same phase angle, the controller 100 controls the phase of the rear control shaft 102 so that the roughness Rn corresponding to the first cylinder 211 and the second cylinder 212 falls within the range of the allowable roughness Rs.

That is, the controller 100 repeats the process of controlling the phase of the rear control shaft 102 so that the roughness Rn corresponding to the first cylinder 211 and the second cylinder 212 falls within the range of the allowable roughness Rs.

If a cylinder that does not fall within the range of the predetermined allowable roughness Rs is not the first cylinder 211 or second cylinder 212 corresponding to the rear cam unit 70, the controller 100 drives the phase controller 300 to control the phase of the front control shaft 102*a* at step S70.

That is, the controller 100 controls the phase of the front control shaft 102*a* with respect to the rear control shaft 102 while the roughness Rn corresponding to the first cylinder 211 and the second cylinder 212 is within the allowable roughness Rs range. Through this, the controller 100 controls the phase of the front control shaft 102*a* so that the roughness Rn of the third cylinder 211 or fourth cylinder 214 falls within the range of the allowable roughness Rs at step S70.

Through the process, it is judged that the combust stability of the entire cylinder is within the allowable range, and the phases of the front control shaft 102*a* and the rear control shaft 102 can be fixed through the fixing portion 330.

The control method of the continuous variable valve duration apparatus may further include a step S60 of recording control performance of the main driving unit 106 and the phase controller 300.

In other words, the controller 100 may count the number of times C of the control of the main driving unit 106 and the phase controller 300 and store it in the memory 101.

The controller 100 may suspend control if the recorded number of control executions C corresponds to a predetermined control executions recording Cs at step S80.

For example, the controller 100 may repeat the control execution of the main driving unit 106 and the phase controller 300 indefinitely. However, if it corresponds to the predetermined control performance record Cs through the experiment, it is judged that the alignment of the continuous variable valve duration apparatus is out of the allowable range and control can be terminated.

In this case, the controller 100 outputs a corresponding warning signal to allow the vehicle to enter the repair process in the manufacturing process, or it can warn the driver when driving S90.

As described above, according to the continuous variable valve duration apparatus and the control method for the same according to an embodiment of the present disclosure, it is possible to improve the engine operation by correcting the manufacturing deviation of the CVVD apparatus.

While this present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the present disclosure.

| <Description of symbols> | |
|---|---|
| 1: | engine |
| 3: | cylinder head |
| 5: | engine block |
| 20: | vehicle operating condition measurement unit |
| 21: | accelerator pedal sensor |
| 22: | brake pedal sensor |
| 23: | outside temperature sensor |
| 24: | coolant temperature sensor |
| 30: | camshaft |
| 32: | camshaft oil hole |
| 34: | camshaft hole |
| 50, 50a: | rear worm wheel, front worm wheel |
| 52: | inner thread |
| 54: | outer thread |
| 60: | roller wheel |
| 62: | wheel body |
| 64: | wheel head |
| 66: | body oil hole |
| 68: | oil groove |
| 69: | communicate hole |
| 70, 70a: | rear, front cam unit |
| 71, 72: | cam |
| 73a, 73b: | first, second cam portion |
| 74: | cam slot |
| 80, 80a: | rear inner wheel, front inner wheel |
| 81, 81a | first, second inner wheel |
| 82: | roller cam |
| 82a: | roller cam body |
| 82b: | roller cam head |
| 82c: | protrusion |
| 83: | cam slot |
| 86: | first sliding hole |
| 88: | second sliding hole |
| 90, 90a: | rear, front wheel housing |
| 91: | guide shaft |
| 92, 92a: | rear, front guide thread |
| 94: | guide rod |
| 95: | upper stopper |
| 96: | lower stopper |
| 100: | controller |
| 101: | memory |

-continued

| <Description of symbols> | |
|---|---|
| 102, 102a: | rear control shaft, front control shaft |
| 103: | outer shaft |
| 103a: | inner shaft |
| 104, 104a: | rear control worm, front control worm |
| 106: | main driving unit |
| 130, 130a: | rear guide bracket, front guide bracket |
| 131: | upper guide boss |
| 132: | control shaft hole |
| 133: | lower guide boss |
| 140, 141: | first, second bearing |
| 150: | thrust bearing |
| 152: | worm cap |
| 160: | control shaft bearing |
| 170: | upper bushing |
| 172: | lower bushing |
| 180: | insert |
| 182: | insert protrusion |
| 200: | valve |
| 211-214: | first-fourth cylinder |
| 300: | phase controller |
| 302: | stator |
| 304: | rotor |
| 306: | phase angle sensor |
| 307-309: | slip ring |
| 310-312: | brush |
| 321-324: | vibration sensor |
| 330: | fixing portion |
| 331: | bolt hole |
| 332: | bolt |
| 340: | phase controller bracket |

What is claimed is:

1. A continuous variable valve duration apparatus comprising:

a camshaft;

a front cam unit and a rear cam unit, each of which is formed with cams, wherein the camshaft is inserted through the front and rear cam units and a phase relative to the camshaft is varied;

a front inner wheel and a rear inner wheel configured to transmit a rotation of the camshaft to the front cam unit and the rear cam unit, respectively;

a front guide bracket and a rear guide bracket;

a front wheel housing and a rear wheel housing to which the front inner wheel and the rear inner wheel are rotatably inserted, respectively, wherein a front guide thread and a rear guide thread are formed in the front wheel housing and the rear wheel housing, respectively, and the front wheel housing and the rear wheel housing are configured to movably insert into the front guide bracket and the rear guide bracket, respectively;

a front control shaft on which a front control worm for rotating the front guide thread is formed;

a rear control shaft on which a rear control worm for rotating the rear guide thread is formed;

a phase controller configured to selectively change a relative phase of the front control shaft and the rear control shaft;

a main driving unit configured to rotate the rear control shaft;

vibration sensors configured to measure a vibration of each cylinder, among a plurality of cylinders, corresponding to the front cam unit and the rear cam unit and configured to output corresponding signals; and wherein a controller is configured to control an operation of the main driving unit and the phase controller based on the corresponding signals of the respective vibration sensors.

2. The continuous variable valve duration apparatus of claim 1, wherein:

an inner shaft is formed in either the front control shaft or the rear control shaft, while an outer shaft is formed in the other shaft among the front control shaft and the rear control shaft; and the inner shaft is rotatably inserted into the outer shaft, and wherein the phase controller comprises:

a stator mounted on the inner shaft;

a rotor mounted on the outer shaft;

a phase angle sensor configured to measure a relative phase angles of the inner shaft and the outer shaft;

a plurality of slip rings rotatably mounted on the outer shaft to apply power and control signals to the rotor; and brushes contacting the plurality of slip rings, respectively.

3. The continuous variable valve duration apparatus of claim 2, wherein:

the stator includes a permanent magnet; and the rotor includes an electromagnet.

4. The continuous variable valve duration apparatus of claim 2, further comprising a fixing portion configured to fix the inner shaft and the outer shaft.

5. The continuous variable valve duration apparatus of claim 1, further comprising:

a rear worm wheel to which an inner thread configured to engage with the rear guide thread is formed therewithin, to which an outer thread configured to engage with the rear control worm is formed thereto, and the rear worm wheel rotatably mounted to the rear guide bracket; and a front worm wheel to which an inner thread configured to engage with the front guide thread is formed therewithin, to which an outer thread configured to engage with the front control worm is formed thereto, and the front worm wheel rotatably mounted to the front guide bracket.

6. The continuous variable valve duration apparatus of claim 1, wherein the front guide bracket and the rear guide bracket have a control shaft hole into which the front control shaft and the rear control shaft are respectively inserted.

7. The continuous variable valve duration apparatus of claim 1, wherein:

a first and second sliding hole is formed in the front inner wheel and the rear inner wheel, respectively, and a cam slot is formed in the front cam unit and the rear cam unit, respectively.

8. The continuous variable valve duration apparatus of claim 7, further comprising:

a roller wheel coupled to the camshaft and rotatably inserted into the first sliding hole respectively; and a roller cam slidably inserted into the cam slot and rotatably inserted into the second sliding hole, respectively.

9. The continuous variable valve duration apparatus of claim 8, wherein the roller cam comprises:

a roller cam body slidably inserted into the cam slot;

a cam head rotatably inserted into the second sliding hole; and a protrusion configured to inhibit the roller cam from being removed.

10. The continuous variable valve duration apparatus of claim 9, wherein the roller wheel comprises:

a wheel body slidably connected to the camshaft; and a wheel head rotatably inserted into the first sliding hole.

11. The continuous variable valve duration apparatus of claim 8, wherein:

the front cam unit and the rear cam unit include a first cam portion and a second cam portion which are disposed corresponding to a cylinder and an adjacent cylinder, among the plurality of cylinders, respectively; and the front inner wheel and the rear inner wheel include a first inner wheel and a second inner wheel configured to transmit the rotation of the camshaft to the first cam portion and the second cam portion respectively.

* * * * *